US012273948B2

(12) United States Patent
Chang et al.

(10) Patent No.: US 12,273,948 B2
(45) Date of Patent: Apr. 8, 2025

(54) METHOD FOR RADIO LINK FAILURE RECOVERY AND USER EQUIPMENT

(71) Applicant: Sharp Kabushiki Kaisha, Sakai (JP)

(72) Inventors: Ningjuan Chang, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 371 days.

(21) Appl. No.: 17/783,714

(22) PCT Filed: Dec. 10, 2020

(86) PCT No.: PCT/CN2020/135182
§ 371 (c)(1),
(2) Date: Jun. 9, 2022

(87) PCT Pub. No.: WO2021/115370
PCT Pub. Date: Jun. 17, 2021

(65) Prior Publication Data
US 2023/0022967 A1 Jan. 26, 2023

(30) Foreign Application Priority Data
Dec. 12, 2019 (CN) .......................... 201911297038.9

(51) Int. Cl.
H04W 76/19 (2018.01)
H04W 76/18 (2018.01)
(Continued)

(52) U.S. Cl.
CPC ........... *H04W 76/19* (2018.02); *H04W 76/18* (2018.02); *H04W 36/0069* (2018.08); *H04W 36/08* (2013.01)

(58) Field of Classification Search
CPC . H04W 76/19; H04W 76/18; H04W 36/0069; H04W 36/08; H04W 36/0033;
(Continued)

(56) References Cited

U.S. PATENT DOCUMENTS

2020/0267794 A1* 8/2020 Baek ...................... H04W 76/27
2022/0038926 A1* 2/2022 Kim ....................... H04W 72/56
(Continued)

OTHER PUBLICATIONS

"Discussion on fast RLF recovery when applying CHO and fast MCG recovery" Chongqing, China, 14th-18th 2019 (Year: 2019).*
(Continued)

*Primary Examiner* — Mewale A Ambaye
(74) *Attorney, Agent, or Firm* — Keating & Bennett, LLP

(57) ABSTRACT

Provided in the present disclosure are a method for radio link failure recovery and user equipment. In the method for radio link failure recovery, a user equipment (UE) detects that a handover failure occurs, and when the UE has a stored conditional handover (CHO) configuration, or when the UE has a stored conditional handover (CHO) configuration and CHO recovery is enabled, the UE reverts back to a configuration used in a source cell. The configuration used in the source cell includes one or more of a physical layer dedicated configuration, a medium access control (MAC) layer configuration, or a semi-persistent SPS configuration.

4 Claims, 3 Drawing Sheets

(51) Int. Cl.
*H04W 36/00* (2009.01)
*H04W 36/08* (2009.01)

(58) Field of Classification Search
CPC . H04W 28/04; H04W 48/02; H04W 36/0079; H04W 36/305; H04L 5/0035
See application file for complete search history.

(56) References Cited

U.S. PATENT DOCUMENTS

| | | | |
|---|---|---|---|
| 2023/0040003 A1* | 2/2023 | Kim | H04W 76/18 |
| 2023/0164658 A1* | 5/2023 | Ishii | H04W 36/0055 |
| | | | 370/331 |
| 2023/0199879 A1* | 6/2023 | Zhu | H04W 36/0033 |
| | | | 370/329 |
| 2023/0309171 A1* | 9/2023 | Zhou | H04W 72/23 |
| 2023/0362751 A1* | 11/2023 | Xu | H04W 76/19 |

OTHER PUBLICATIONS

Official Communication issued in International Patent Application No. PCT/CN2020/135182, mailed on Feb. 26, 2021.

"3rd Generation Partnership Project; Technical Specification Group Radio Access Network; NR; Radio Resource Control (RRC) protocol specification (Release 15)", 3GPP TS 38.331 V15.7.0, Sep. 2019, pp. 1-527.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.7.0, Sep. 2019, pp. 1-962.

Rapporteur (Ericsson), "Running CR for 38.331 for CA&DC enh", 3GPP TSG-RAN WG2 Meeting #108, R2-1915282, Nov. 18-22, 2019, pp. 1-92.

ZTE Corporation et al., "Discussion on fast RLF recovery when applying CHO and fast MCG recovery", 3GPP TSG RAN WG2 Meeting #107bis, R2-1913484, Oct. 14-18, 2019, 3 pages.

China Telecom et al., "New Work Item on even further Mobility enhancement in E-UTRAN", 3GPP TSG RAN meeting #83, RP-190272, Mar. 18-21, 2019, 4 pages.

Intel Corporation, "New WID: NR mobility enhancements", 3GPP TSG RAN Meeting #80, RP-181433, May 21-25, 2018, 5 pages.

* cited by examiner

METHOD FOR RADIO LINK FAILURE RECOVERY AND USER EQUIPMENT

TECHNICAL FIELD

The present disclosure relates to the technical field of wireless communications. More specifically, the present disclosure relates to a method for radio link failure recovery and corresponding user equipment.

BACKGROUND

A new research project on 5G technical standards (see non-patent literature: RP-181433: New WID on NR (New Radio) mobility enhancements) was approved in the 3rd Generation Partnership Project (3GPP) RAN #80 plenary session held in June 2018. In addition, there is another new research project on Release 16 based on Long Term Evolution (LTE) (see non-patent literature: RP-190272: WID for Even Further Mobility Enhancement in Evolved-Universal Terrestrial Radio Access Network (E-UTRAN)). One of the research objectives of these two projects is to meet one of the mobility requirements in a network: seamless handover, namely, to achieve a handover interruption time of 0 millisecond or close to 0 millisecond in a cell handover procedure, to improve the robustness of a handover, and to reduce the handover failure rate. Among currently studied solutions for reducing a handover interruption time and/or to improve the robustness of a handover, a solution is referred to as a conditional handover (CHO). In a CHO function, a base station issues a handover command to UE in advance, wherein the handover command includes conditional configuration information. When a configured condition is met, then the UE executes a handover according to the previously received handover command. In this case, by issuing the handover command in advance, the success rate of receiving a handover command can be improved, thereby improving the success rate of a handover, and avoiding a service interruption delay caused by a handover failure resulting from a failure in receiving a handover command.

Provided in the present disclosure are solutions to some problems encountered in implementation of the CHO in an NR system and an LTE system.

SUMMARY

An objective of embodiments of the present disclosure is to provide a solution to the issue of implementing a CHO technology in an NR system and in an LTE system. More specifically, provided in the present disclosure is a solution to the issue of how to use a stored CHO configuration to recover a link connection during a radio link failure. Provided in the embodiments of the present disclosure are a method for radio link failure recovery performed when user equipment has experienced a handover failure and corresponding user equipment.

According to a first aspect of the present disclosure, a method for radio link failure recovery is provided, including: user equipment (UE) detecting that a handover failure occurs, and when the UE has a stored conditional handover (CHO) configuration, or when the UE has a stored conditional handover (CHO) configuration and CHO recovery is enabled, the UE reverting back to a configuration used in a source cell, the configuration used in the source cell including one or more of a physical layer dedicated configuration, a medium access control (MAC) layer configuration, or a semi-persistent SPS configuration.

In the radio link failure recovery method of the first aspect, when the UE does not have the stored CHO configuration or the CHO recovery is not enabled, the UE reverts back to the configuration used in the source cell excluding the physical layer dedicated configuration, the MAC layer configuration and/or the SPS configuration.

In the radio link failure recovery method of the first aspect, the handover failure may include: the UE failing to perform a CHO, and the UE failing to perform a non-CHO.

In the radio link failure recovery method of the first aspect, the method may further include: the UE performing a CHO recovery procedure, in a cell selection procedure of the CHO recovery procedure, when the selected cell is a CHO candidate cell, the UE applying a stored CHO configuration and performing the CHO to the CHO candidate cell, and when the selected cell is not the CHO candidate cell, the UE initiating a radio resource control (RRC) connection re-establishment procedure.

In the radio link failure recovery method of the first aspect, in an initialization phase of initiating the CHO recovery procedure, the UE may perform the following operations: if a timer T310 is running, stopping the timer T310; and if a timer T312 associated with a master cell group (MCG) is running, stopping the timer T312.

According to a second aspect of the present disclosure, a method for radio link failure recovery is provided, including: user equipment (UE) detecting that a handover failure occurs, the UE reverting back to a configuration used in a source cell excluding a physical layer dedicated configuration, a medium access control (MAC) layer configuration, and/or a semi-persistent SPS configuration; and the UE performing a conditional handover (CHO) recovery procedure, and in a cell selection procedure of the CHO recovery procedure, when the selected cell is a CHO candidate cell, the UE reverting back to the physical layer dedicated configuration, the MAC layer configuration and/or the SPS configuration used in the source cell.

In the radio link failure recovery method of the second aspect, in the cell selection procedure, when the selected cell is not the CHO candidate cell, the UE may initiate a radio resource control (RRC) connection re-establishment procedure.

In the radio link failure recovery method of the second aspect, when the selected cell is the CHO candidate cell, the UE may perform a CHO to the CHO candidate cell based on a configuration after the revert back and applying the stored CHO configuration.

In the radio link failure recovery method of the second aspect, in an initialization phase of initiating the CHO recovery procedure, the UE may perform the following operations: if a timer T310 is running, stopping the timer T310; and if a timer T312 associated with a master cell group (MCG) is running, stopping the timer T312.

According to a third aspect of the present disclosure, user equipment (UE) is provided, and comprises: a processor; and a memory storing instructions, wherein the instructions, when run by the processor, perform the method for radio link failure recovery according to the context.

BRIEF DESCRIPTION OF DRAWINGS

In order to understand the present disclosure and advantages thereof more fully, reference will now be made to the following description made in conjunction with the accompanying drawings.

In the drawings, identical or similar structures are marked by identical or similar reference numerals.

DETAILED DESCRIPTION

Figure 1:
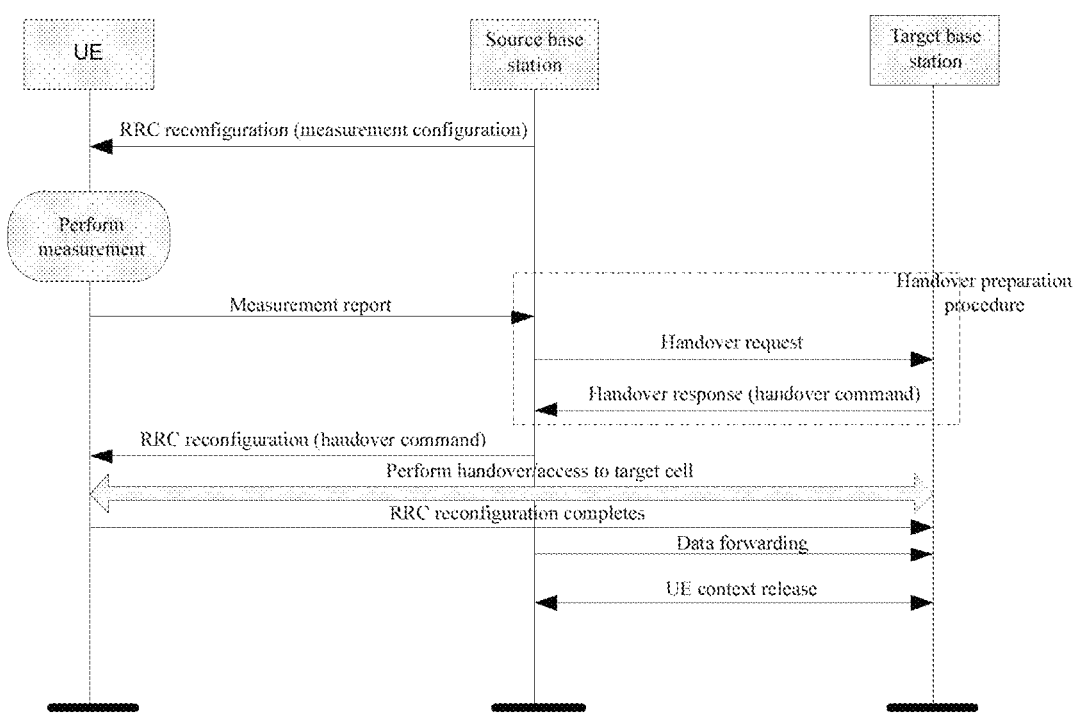
FIG. 1 is a sequence diagram showing that user equipment (UE) in a connected state changes a serving cell by means of a handover procedure.

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof mean inclusion without limitation; the term "or" may have an inclusive meaning and means "and/or".

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the accompanying drawings.

A plurality of embodiments according to the present disclosure are specifically described below by using a Long Term Evolution (LTE)/NR mobile communication system and subsequent evolved versions thereof as an exemplary application environment. It is to be noted that the present disclosure is not limited to the following embodiments, but is applicable to other wireless communications systems. In the present disclosure, unless otherwise specified, the concept of a cell and the concept of a base station are interchangeable. An LTE system may also be a 5G LTE system and a post-5G LTE system (such as an LTE system referred to as an eLTE system or an LTE system that can be connected to a 5G core network). In addition, the LTE can be replaced with an evolved universal terrestrial radio access (E-UTRA) or an evolved universal terrestrial radio access network (E-UTRAN). In the present disclosure, a handover refers to change of a primary cell (PCell) initiated by a network side, the change including inter-cell change of a primary cell and intra-cell change of a primary cell. That is, a primary cell of UE is changed from a source cell to a target cell, wherein the source cell and the target cell may be the same cell or different cells. In this procedure, a secret key or a security algorithm for access layer security may also be updated. The source cell is also referred to as a source base station, or may also be a source beam or a source transmission point (TRP). The target cell may also be referred to as a target base station, or may also be a target beam or a target transmission point. The source cell refers to a cell connected to serve the UE before a handover procedure is initiated, that is, a cell from which the UE receives an RRC message including a handover command. The target cell refers to a cell connected to serve the UE after the handover procedure is successfully completed, or a cell indicated by a target cell identifier included in the handover command, or a cell that the UE accesses when being instructed to execute a handover. The handover command described in the present disclosure is used to trigger the UE to execute a handover. In an NR system, the handover command is an RRC reconfiguration message including a synchronized reconfiguration (Reconfigurationwithsync) information element, or rather, the handover command is an RRC reconfiguration message including a synchronized reconfiguration (Reconfigurationwithsync) information element for a master cell group (MCG). In this case, a handover may also be referred to as synchronous reconfiguration. In an LTE system, the handover command is an RRC connection reconfiguration message including a mobility control information (MobilityControlInformation) information element. The synchronized reconfiguration information element or the mobility control information information element includes configuration information of the target cell, for example, the target cell identifier, a target cell frequency, common configurations of the target cell such as system information, a random access configuration used by the UE to access the target cell, a security parameter configuration of the UE in the target cell, a radio bearer configuration of the UE in the target cell, and the like. However, the embodiments described in the present disclosure may also be applicable to a handover or change of a primary secondary cell (PSCell). The PSCell refers to a serving cell where the UE performs a random access procedure or initial physical uplink shared channel (PUSCH) transmission in a procedure of changing or adding a secondary cell group in a secondary cell group (SCG). Generally, PCell and PSCell are collectively referred to as special cells (SpCell). For simplicity of description, in the present disclosure, the RRC reconfiguration message is equivalent to the RRC connection reconfiguration message; similarly, an RRC reconfiguration complete message serving as a response message thereto is equivalent to an RRC connection reconfiguration complete message. An RRC connection re-establishment request message is equivalent to an RRC re-establishment request message, and an RRC re-establishment message is equivalent to an RRC connection re-establishment message; similarly, an RRC re-establishment complete message serving as a response message thereto is equivalent to an RRC connection re-establishment complete message. The handover command is equivalent to the RRC message including the handover command, and refers to an RRC message or a configuration in the RRC message triggering the UE to execute a handover. The handover configuration refers to all of or part of configurations in the handover command. "Cancel", "release", "delete", "flush", and "clear" are interchangeable. "Execute", "use", and "apply" are interchangeable. "Configure" and "reconfigure" are interchangeable. "Link" and "connection" are interchangeable. "Monitor" and "detect" are interchangeable. A conditional handover command and a conditional handover configuration are interchangeable.

In the present application, after receiving a radio resource control (RRC) message including a handover command, the UE may maintain communication, including data transmission, with the source base station before initiating a handover procedure so as to further reduce data transmission interruption time.

The prior art involved in the embodiment of the present disclosure will be briefly described below.

A general handover procedure in an existing function:

User mobility in a connected state is implemented mainly by means of a handover procedure, and the handover refers to a procedure in which UE in an RRC connected state changes a serving cell (primary cell). FIG. 1 is a sequence diagram showing that user equipment (UE) in a connected state changes a serving cell by means of a handover procedure. As shown in FIG. 1, the handover procedure generally includes the following phases:

Phase 1, a measurement phase. A base station issues a measurement configuration to user equipment (UE); the UE performs, on the basis of the measurement configuration, measurement on a radio link corresponding to a serving cell or a neighboring cell; when a configured measurement reporting condition is met, the UE transmits a measurement report to the base station. The measurement phase is not mandatory, and the base station may also perform a blind handover to UE if the base station does not have any valid measurement report.

Phase 2, a handover preparation phase. The base station determines, according to the received measurement report and other factors such as a payload of the base station, whether to trigger a handover for the UE. If it is determined to trigger a handover for the UE, then a source base station initiates a handover preparation procedure by transmitting a handover request message to a target base station. The target base station determines, according to the context of the UE in the handover request message, available resources of the target base station, and other factors, whether to accept this handover request of the UE. If so, then the target base station replies to the source base station with a handover acknowledgment message, wherein the handover acknowledgment message includes an inter-node RRC message, namely, a handover command.

Phase 3, a handover execution phase. The source base station issues the handover command to the UE, and starts to forward data of the UE to the target base station. UE receiving the handover command immediately applies a configuration in the handover command to execute a handover, accesses the target base station by means of a random access procedure, and transmits an acknowledgment message to the target base station. The random access procedure is not mandatory.

Phase 4, a handover completion phase. After confirming that the UE successfully accesses the target base station, the target base station transmits a handover complete message to the source base station. According to the handover complete message, the source base station may release the UE context stored thereon.

Figure 2:
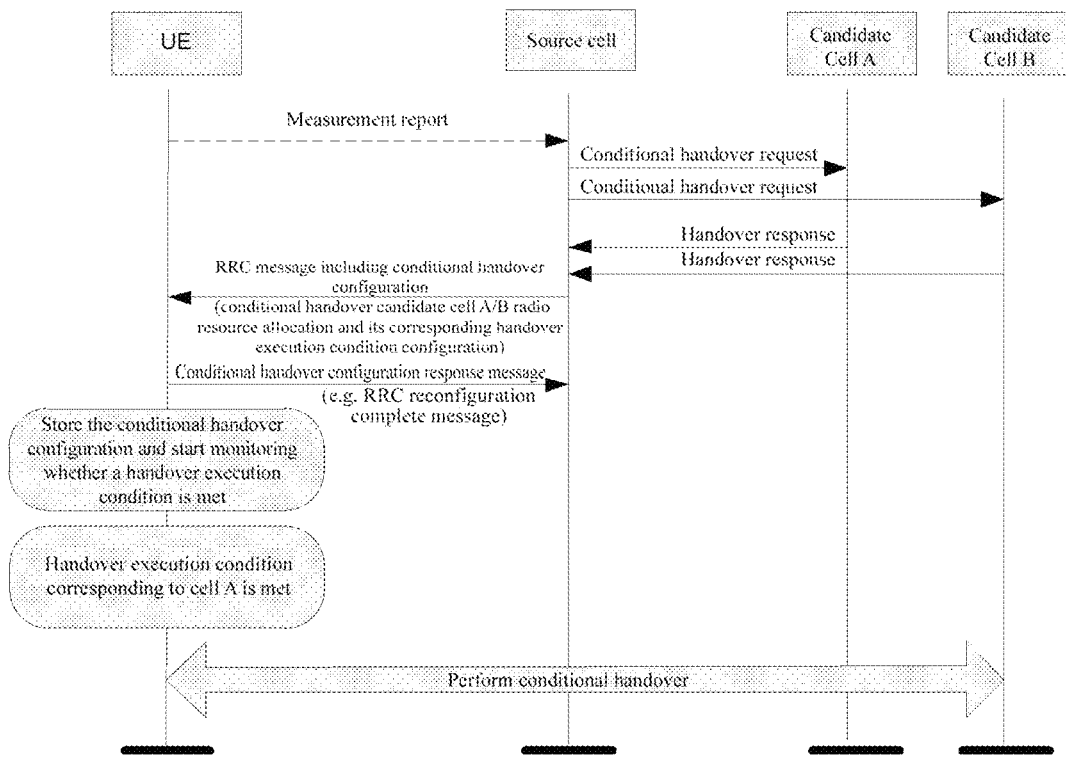
FIG. 2 is a schematic diagram showing a flow of a conditional handover.

A conditional handover:

In the above general handover procedure, one reason for a handover failure and therefore a long data transmission interruption is failure to receive a handover command caused when the handover command is not issued in a timely manner. With respect to the problem, Release 16 introduces a conditional handover (CHO). FIG. 2 is a schematic diagram showing a flow of a conditional handover. In the conditional handover, a relatively conservative measurement report threshold is set, so that the base station acquires a measurement result in advance, and performs handover preparation with a selected target base station in advance according to the measurement result. In this case, the base station can issue a handover command RRC message including a CHO candidate cell and a corresponding CHO execution condition to the UE in advance before an actual handover condition (relative to the conservative measurement report threshold) is met. The RRC message (an RRC connection reconfiguration message in an LTE system) supports more than one CHO candidate cell and a CHO configuration (that is, a configuration included in the RRC connection reconfiguration message configured by a candidate target cell) corresponding to each CHO candidate cell and the CHO execution condition. After receiving the conditional handover command, the UE does not perform the handover immediately, but stores the received CHO configuration (that is, the configuration included in the RRC reconfiguration message configured by the target cell), and starts monitoring the link quality of the source cell or the link quality of the target cell according to the CHO execution condition corresponding to the CHO candidate cell carried in the handover command message to evaluate whether the CHO execution condition is met. The UE starts performing the handover according to the stored CHO configuration to access the target cell only when detecting that one or more of the configured CHO execution conditions is met. Generally, if the CHO configuration includes a full configuration information element (fullconfig) (or the fullconfig information element is set to TURE), the UE directly applies the CHO configuration to switch to the target cell, that is, the CHO configuration is irrelevant to a source cell configuration. Otherwise, the UE applies the CHO configuration of the target cell based on the source cell configuration, that is, the CHO configuration (stored by the UE) is a delta configuration based on the source cell configuration. In a procedure of performing the handover, the UE stops the evaluation of the configured CHO execution condition. In summary, the conditional handover refers to a handover procedure that is performed only when one or more of the configured CHO execution conditions are met. The CHO execution condition may be a measurement event. For example, the condition is a measurement event A3 (signal quality in a neighboring cell is superior to that in a serving cell by an offset value for a continuous period of time). The neighboring cell corresponds to a CHO candidate target cell. One CHO candidate cell may correspond to one or more than one CHO execution condition. When a plurality of CHO execution conditions are configured for one candidate cell, the UE starts performing the corresponding handover only when all CHO execution conditions are met. Generally, all measurement events defined in current 3GPP standard specifications 36.331 and 38.331 (see section 5.5.4), such as A1 to A5, can be included in the CHO handover command as the CHO execution conditions.

A link recovery function in the existing function:

First, a radio link failure (RLF) and a handover failure (HOF) are introduced. When one or more of the following conditions occur, the UE considers that the RLF of the MCG occurs:

Case 1: A timer T310 used for radio link failure detection expires. When the RRC layer of the UE receives, upon detecting a physical layer problem of the primary cell (Pcell), N310 consecutive out-of-sync indications from a lower layer, in this case, if timers T300 (used to detect an RRC connection establishment procedure), T301 (used to detect an RRC connection re-establishment procedure), T304 (used to detect a handover procedure) or T311 (used to detect a cell selection phase in the RRC connection re-establishment procedure) for RRC procedure control are not running, the T310 is started. N310 is a constant configured by a network side. If the network side does not configure the constant, then the UE uses a predefined default value.

Case 2: The timer T312 associated with the MCG expires. The T312 is used for radio link failure detection when a measurement report is triggered. When the RRC layer of the UE triggers a measurement report of which the trigger type is set to event and which is configured with a measurement ID that can use the T312, if the T310 is running, the corresponding the T312 is started. More specifically, in the LTE system, the T312 is started when one of the following conditions is met: condition 1, for a measurement ID, if a trigger type is set to "event," and all measurements of one or a plurality of applicable cells having been filtered by a layer 3 have met, within a time period timetoTrigger, an entry condition applied to the event, and a measurement report list VarMeasReportList stored in the UE does not include any measurement report item for the measurement ID, and if the UE supports the T312 and the configuration for the event includes a configuration (an information element useT312) indicating that the T312 is available, and if the T310 is running, and if the T312 is not running, then the T312 is started. Condition 2, for a measurement ID, if a trigger type is set to "event," and all measurements of one or a plurality of applicable cells not included in a triggered cell list cellsTriggeredList having been filtered by the layer 3 have met, within the time period timetoTrigger, an entry condition applied to the event, and if the UE supports the T312 and the configuration for the event includes a configuration (the information element useT312) indicating that the T312 is available, and if the T310 is running, and if the T312 is not running, then the T312 is started. A value of the T312 configured by the network side for a measurement object associated with the measurement ID is used as the value of the T312.

Case 3: A random access failure indication from a medium access control (MAC) layer is received and at this time, a timer T300, T301, T304, or T311 used for RRC procedure control is not running. The MAC refers to a MAC corresponding to an MCG.

Case 4: An indication from a radio link control (RLC) layer corresponding to an MCG is received, and the indication is used to indicate that the RLC retransmission has reached the maximum number of times for a signaling radio bearer (SRB) or a data radio bearer (DRB).

For the HOF, the UE determines an occurrence of the HOF according to the timer T304 for detecting the handover procedure. The UE starts the T304 when starting performing a handover, applies the corresponding RRC configuration in the handover command, and stops T304 when the handover is successfully completed. If the T304 expires, the UE considers that the HOF occurs. After the HOF, the UE reverts back to the configuration used in the source cell before the handover is performed. The configuration includes state variables and parameters corresponding to all radio bearers, but does not include a physical layer dedicated configuration (referring to a configuration in a PhysicalConfigDedicated information element), a MAC dedicated configuration (referring to a configuration in a mac-Mainconfig information element), and a semi-persistent configuration (referring to a configuration in an sps-config information element).

Next, an existing link recovery mechanism is described. After a radio link failure (RLF) or a handover procedure failure (HOF) of the master cell group occurs, the UE initiates an RRC connection re-establishment procedure to reestablish/recover a connection with the network side. In the initiated RRC connection re-establishment procedure, the UE firstly performs a cell selection procedure to select a re-establishment cell, and transmits an RRC connection re-establishment request message to the cell. When the UE receives an RRC connection re-establishment message serving as a response message, the UE re-establishes an RRC connection according to the configuration in the RRC connection re-establishment message, and feeds back an RRC connection re-establishment complete message to a base station to successfully end the RRC connection re-establishment procedure. The re-establishment cell refers to a cell for the UE to transmit an RRC connection re-establishment request message and receive a corresponding response message for re-establishing RRC connection in the RRC connected state. A timer T311 is defined in the RRC re-establishment procedure. The T311 is started when the UE initiates the RRC connection re-establishment procedure. When a suitable cell for re-establishment is selected in the cell selection procedure, the T311 is stopped; and if the UE cannot select a suitable cell when the T311 expires, at this time, it is generally considered that the UE is out of coverage and the UE will leave the RRC connected state to enter an RRC idle state or an RRC inactive state (RRC_Inactive).

Radio link recovery using the stored conditional handover configuration:

In a conditional handover scenario, the UE maintains communication with a source base station during a period from a time when the UE receives and stores a CHO configuration to a time when the corresponding CHO condition is met and the handover is performed according to the received CHO configuration. At the $106^{th}$ and $107^{th}$ meetings of the 3GPP RAN2 working group, a conclusion was reached on the implementation of a CHO procedure in the RLF/HOF: when the RLF or HOF occurs, the UE first selects a cell to perform link recovery through a cell selection procedure. If the selected cell is a CHO candidate cell (that is, the cell corresponds to the stored CHO configuration), the UE performs a handover to the cell according to the CHO configuration corresponding to the cell, and if the selected cell is not a CHO candidate cell, the UE attempts to recover a connection with the network side by transmitting an RRC connection establishment request to the selected cell, that is, a conventional RRC connection re-establishment procedure is used. In the present disclosure, the enhanced link recovery function is referred to as a link failure recovery function based on a CHO configuration (referred to as a CHO link recovery function for short). Generally, the serving cell enables the CHO link recover function of the UE through an enable indication in an RRC signaling. Currently, the UE can perform CHO recovery only once after the RLF/HOF occurs. That is, if the CHO performed in the CHO recovery procedure fails, the UE directly enters an idle state. In another implementation, the UE directly triggers the RRC re-establishment procedure.

Radio Link Recovery by MCG Failure Information Procedure

The 3GPP RAN2 working group further introduces a fast MCG link recovery function. The fast MCG link recovery function is provided relative to the existing link recovery function (that is, link connection is recovered by means of an RRC connection re-establishment procedure), also known as an MCG failure information procedure. The purpose of the procedure is to inform a master base station of an MCG radio link failure the UE has experienced. For a UE configured with a split SRB1 or SRB3, upon detecting an MCG RLF for the UE, if neither the MCG nor the SCG of the UE is suspended and a fast MCG link recovery function is configured, the UE initiates an MCG failure information procedure, and informs the master base station of MCG link failure information included in an MCG failure information RRC message through an SCG link. The master base station receiving the MCG link failure information report may transmit an RRC connection reconfiguration message to the UE to trigger the UE to execute a handover to a new cell or transmit an RRC release message to release the connection of the UE. The timer T316 is used to detect an MCG failure information procedure. The UE starts the T316 when transmitting the MCG failure information RRC message; upon recovery of the MCG transmission or reception of a response (such as an RRC release message or an RRC reconfiguration message used to instruct the UE to perform handover) from the network side or initiation of an RRC re-establishment procedure, the T316 is stopped; and if the T316 expires, the UE considers that the MCG failure information procedure has ended, and initiates the RRC re-establishment procedure to recover an MCG link. This fast MCG link recovery function can be applied to the case in which multi-radio access technology dual connectivity (MR-DC), for example, NR E-UTRA dual connectivity (NE-DC), E-UTRA NR dual connectivity (EN-DC), new radio dual connectivity (NR DC), next generation-radio access network E-UTRA NR dual connectivity (NGEN-DC), intra-E-UTRAN DC (LTE DC), or the like, is configured.

Provided in the present disclosure is a solution mainly to the problem of how to recover a connection with a network side for UE configured with a CHO when an RLF/HOF occurs. More specifically, how to apply the stored CHO configuration to perform handover to the target cell during the HOF, how to prevent a radio link failure from occurring again in an ongoing CHO link recovery procedure, and how to coordinate two link recovery functions to recover a link when the UE is configured with both of the CHO recovery function and the MCG failure information function, are problems that the present disclosure focuses on and resolves.

Several embodiments performed on the UE based on the above problem in the present disclosure are as follows.

Embodiment 1

This embodiment is performed on the UE, and is further performed at an RRC layer of the UE. When the HOF in which the handover to cell A fails occurs, the UE changes the RRC configuration back to the configuration used in the source cell before the handover is performed, but the configuration does not include the physical layer dedicated configuration and the MAC configuration, that is, the physical layer dedicated configuration and the MAC configuration currently used by the UE are configurations from the handover target cell A corresponding to the HOF. If the UE has the stored CHO configuration, and the CHO recovery function is enabled by the network side, the UE may initiate the CHO recovery procedure to a CHO candidate cell B to recover a link. When the UE applies the CHO configuration corresponding to the CHO candidate cell B in the CHO recovery procedure, if the CHO configuration is a delta configuration, the physical layer dedicated configuration and MAC layer configuration of the cell B applied by the UE are based on the current related configuration (that is, the cell A), and the stored CHO configuration of the cell B is not configured in the delta configuration of the relevant configuration of the cell A. This makes the configuration applied by the network side and the UE inconsistent after the CHO handover, and the mismatched configuration may lead to further configuration/link failures. Provided in this embodiment is a solution to the problem. In this embodiment, when the HOF occurs, the UE that can perform CHO recovery to recover a link changes the physical layer dedicated configuration or MAC layer dedicated configuration back to the configuration used in the source cell before the handover, so that when performing the CHO handover for subsequent CHO recovery, the UE applies the stored delta configuration of the CHO candidate cell based on the configuration of the source cell before the handover, so as to maintain the consistency of the RRC configurations with the network side after the handover.

Figure 3:
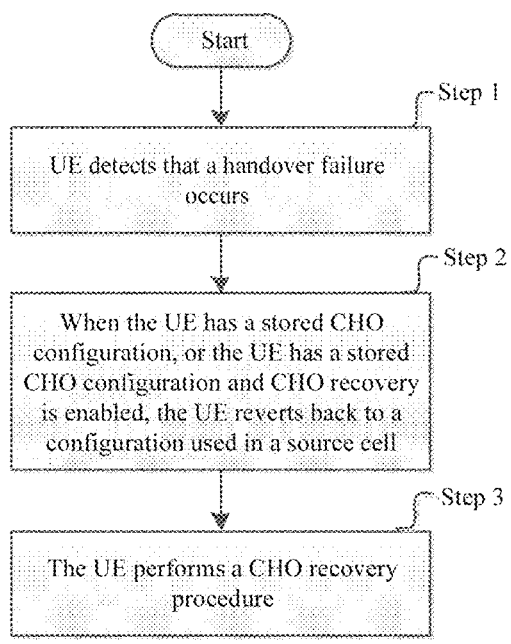
FIG. 3 is a flowchart showing radio link recovery based on a conditional handover according to embodiment 1.

For example, FIG. 3 is a flowchart showing radio link recovery based on conditional handover according to embodiment 1. As shown in FIG. 3, an example of a radio link failure recovery method based on a conditional handover includes the following steps.

Step 1: UE detects that a handover failure occurs (T304 expires). The handover failure is a failure of the UE to perform a conventional non-CHO handover, or a failure of the UE to perform a CHO. The conventional non-CHO handover failure refers to a condition that the UE immediately applies, upon receiving an RRC reconfiguration message including a handover command, the received configuration to perform a handover to a target cell, including a non-random access handover (rach-skip is configured in the handover command), a Make-Before-Break (MBB) handover (makebeforebreak is configured in the handover command) and a dual active protocol stack (DAPS) handover (referring to maintaining a connection with a source cell in a handover procedure after the RRC message for the handover is received, and releasing the source cell only when the target cell is successfully accessed, wherein the RRC message includes an indication/enabling of the DAPS handover configuration).

Step 2: If the UE has a stored CHO configuration, or the UE has a stored CHO configuration and CHO recovery is enabled, upon an HOF in step 1, the UE reverts back to a configuration used in the source cell. Specifically, when the CHO recovery is enabled by default in the UE, if the UE has a stored CHO configuration, the UE reverts back to the configuration used in the source cell when the HOF occurs. In addition, when the CHO recovery is not enabled by default in the UE, if the UE has the stored CHO configuration and the CHO recovery is enabled, the UE reverts back to the configuration used in the source cell when the HOF occurs. Further, the configuration used in the source cell includes one or more of physical layer dedicated configuration, MAC layer configuration, or SPS configuration. The CHO recovery being enabled means that the UE is configured with a CHO recovery enabled indication (for example, identified by an attemptCHO information element) in the received RRC message including the CHO configuration, or the CHO recovery enabled indication is set to "TRUE" or "1". The CHO recovery enabled indication is used to allow the UE to recover a link by performing the CHO if the selected cell is a CHO candidate cell after a link failure occurs. A specific interpretation is: if it is present in the RRC message, and if the selected cell is a CHO candidate cell in a first cell selection procedure after the link failure, the UE performs a CHO to the cell.

The operation of the step is otherwise described as follows: when a handover failure occurs, if the UE has a stored CHO configuration, or the UE has the stored CHO configuration and the CHO recovery is enabled, the UE reverts back to the configuration used in the source cell; otherwise, if the UE does not have the stored CHO configuration or the CHO recovery is not enabled, the UE reverts back to the configuration used in the source cell excluding the physical layer dedicated configuration, MAC layer configuration, and/or SPS configuration.

Step 3: The UE performs a CHO recovery procedure, including: the UE performing a cell selection procedure, if the selected (suitable) cell is a CHO candidate cell, the UE applying the stored CHO configuration for the cell, and performing the CHO to the cell; otherwise, the UE initiating an RRC connection re-establishment procedure. The UE applies the stored CHO configuration based on the configuration after the UE reverts back in step 2. Step 3 is optional.

Obviously, before step 1, this embodiment further includes: the UE receiving the RRC reconfiguration message including a CHO configuration and a CHO execution condition from the source cell, storing the CHO configuration, and starting monitoring whether the CHO execution condition is met according to the CHO execution condition included in the RRC message. In step 1, before the HOF, the UE may further perform a handover to a target base station. The statement that the UE has the stored CHO configuration can also be described as the UE being configured with a CHO. The source cell is a source PCell.

Embodiment 2

This embodiment is performed on the UE, and is further performed at an RRC layer of the UE. This embodiment is consistent with the scenario described in embodiment 1, and is used to maintain the consistency of the RRC configurations with the network side after the CHO recovery procedure is performed after the handover fails. This embodiment differs from embodiment 1 in that the UE changes its physical layer configuration and so on back to the corresponding configuration used in the source cell before the handover failure occurs in the CHO recovery procedure, so as to ensure that the UE can correctly apply the stored CHO configuration corresponding to the selected cell to perform the handover.

Figure 4:
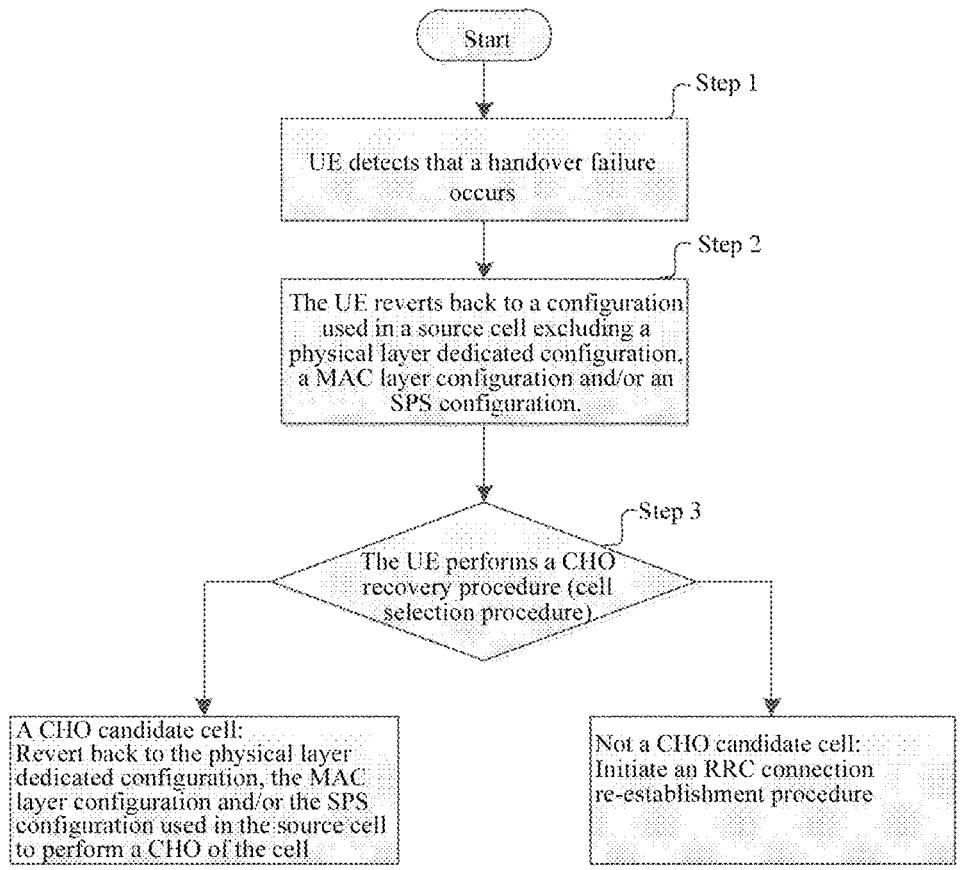
FIG. 4 is a flowchart showing radio link recovery based on a conditional handover according to embodiment 2.

As another example, FIG. 4 is a flowchart showing radio link recovery based on a conditional handover according to embodiment 2. As shown in FIG. 4, another example of a radio link failure recovery method based on a conditional handover includes the following steps.

Step 1: UE has experienced a handover failure (T304 expires). The handover failure is a failure of the UE to perform a conventional non-CHO handover, or a failure of the UE to perform a CHO. The conventional non-CHO handover failure means that the UE immediately applies, upon receiving an RRC reconfiguration message including a handover command, the received configuration to perform a handover to a target cell, including a non-random access handover, an MBB handover, and a DAPS handover.

Step 2: When an HOF occurs in step 1, the UE reverts back to the configuration used in the source cell excluding a physical layer dedicated configuration, a MAC layer configuration and/or an SPS configuration.

Step 3: The UE performs a CHO recovery procedure including: the UE performing a cell selection procedure, if the selected (suitable) cell is a CHO candidate cell, the UE performing the following operations: reverting back to the physical layer dedicated configuration, MAC layer configuration, and/or SPS configuration used in the source cell, applying the stored CHO configuration for the cell based on the current configuration, and performing a CHO to the cell; otherwise if the selected cell is not a CHO candidate cell, the UE initiating an RRC connection reestablishment procedure. The applying the stored CHO configuration for the cell based on the current configuration refers to applying the stored CHO configuration based on the RRC configuration after the UE reverts back in step 2 and step 3.

Preferably, the UE performs step 3 only when the UE has the stored CHO configuration and the CHO recovery is enabled. The CHO recovery being enabled is described in embodiment 1, which will not be described herein again.

Obviously, before step 1, this embodiment further includes: the UE receiving the RRC reconfiguration message including a CHO configuration and a CHO execution condition from the source cell, storing the CHO configuration, and starting monitoring whether the CHO execution condition is met according to the CHO execution condition included in the RRC message. In step 1, before the HOF, the UE may further perform a handover to a target base station. The statement that the UE has the stored CHO configuration can also be described as the UE being configured with a CHO. The source cell is a source PCell.

Embodiment 3

This embodiment is performed on the UE, and is further performed at an RRC layer of the UE. This embodiment is consistent with the scenario described in embodiment 1, and is used to maintain the consistency of the RRC configurations with the network side after the CHO recovery procedure is performed after the handover fails. This embodiment differs from embodiment 1 in that the UE does not change its physical layer configuration and so on back to the corresponding configuration used in the source cell before the handover failure occurs in the CHO recovery procedure, and instead, uses a corresponding system default configuration, so as to ensure that the UE can correctly apply the stored CHO configuration corresponding to the selected cell to perform the handover.

Step 1: UE has experienced a handover failure (T304 expires). The handover failure is a failure of the UE to perform a conventional non-CHO handover, or a failure of the UE to perform a CHO. The conventional non-CHO handover failure means that the UE immediately applies, upon receiving an RRC reconfiguration message including a handover command, the received configuration to perform a handover to a target cell, including a non-random access handover, an MBB handover, and a DAPS handover.

Step 2: When an HOF occurs in step 1, the UE reverts back to the configuration used in the source cell excluding a physical layer dedicated configuration, a MAC layer configuration and/or an SPS configuration.

Step 3: The UE performs a CHO recovery procedure, including: the UE performing a cell selection procedure, if the selected (suitable) cell is a CHO candidate cell, the UE performing the following operations: applying the system default physical layer dedicated configuration, default MAC layer configuration and/or default SPS configuration, and applying the stored CHO configuration for the cell based on the current configuration, and performing a CHO to the cell; otherwise if the selected cell is not a CHO candidate cell, the UE initiating an RRC connection reestablishment procedure. The applying the stored CHO configuration for the cell based on the current configuration refers to applying the stored CHO configuration based on the RRC configuration after the UE reverts back in step 2 and the system default configuration applied in step 3.

Preferably, the UE performs step 3 only when the UE has the stored CHO configuration and the CHO recovery is enabled. The CHO recovery being enabled is described in embodiment 1, which will not be described herein again.

Step 4: When performing the CHO to the selected cell in the CHO recovery procedure, the UE transmits an indication message to the target cell. The indication message is used to indicate that this CHO is initiated due to link failure (HOF). Further, the indication message is used to indicate that in this CHO, the UE applies the system default physical layer dedicated configuration, MAC layer configuration or SPS configuration. The indication message may be included in a first PUSCH (message 3 transmitted by using resources allocated in the random access response) in a random access procedure of accessing the target base station and sent in the form of a MAC control element (MAC CE) or an RRC message (handover response message (an RRC connection reconfiguration generated and sent to the target cell when the T304 is running is completed)), or is sent in the form of the MAC CE or the RRC message in the first PUSCH after the handover succeeds. The handover success may indicate that the random access procedure is successfully completed, for example, the RRC layer receives, from the MAC layer, an indication that the random access procedure is successfully completed.

Obviously, before step 1, this embodiment further includes: the UE receiving the RRC reconfiguration message including a CHO configuration and a CHO execution condition from the source cell, storing the CHO configuration, and starting monitoring whether the CHO execution condition is met according to the CHO execution condition included in the RRC message. In step 1, before the HOF, the UE may further perform a handover to a target base station. The statement that the UE has the stored CHO configuration can also be described as the UE being configured with a CHO. The source cell is a source PCell.

Embodiment 4

This embodiment is performed on the UE, and is further performed at an RRC layer of the UE. This embodiment is consistent with the scenario described in embodiment 3, and is used to resolve the problem of maintaining the consistency of the RRC configurations with the network side after the CHO recovery procedure is performed after the handover fails. The embodiment differs from embodiment 3 in that in order to ensure the consistency of configuration between the UE and the network side, the UE always applies the system default physical layer dedicated configuration, MAC configuration or SPS configuration when performing the CHO, regardless of whether the CHO is triggered by a link failure. In this way, the physical layer dedicated configuration, MAC layer configuration or SPS configuration are kept consistent between the network side and the UE, thereby ensuring that the UE can correctly apply the stored CHO configuration corresponding to the selected cell to perform the handover.

Step 1: The UE receives the RRC reconfiguration message including a CHO configuration and a CHO execution condition from the source cell, stores the CHO configuration, and starts monitoring whether the CHO execution condition is met according to the CHO execution condition included in the RRC message.

Step 2: The UE performs the CHO. In the CHO procedure, the UE performs the following operations: applying the system default physical layer dedicated configuration, MAC configuration or SPS configuration; and applying the stored CHO configuration corresponding to the target cell. The CHO configuration is a delta configuration based on a current configuration of the UE. Preferably, a full configuration indication is not included in the CHO configuration.

Preferably, the UE performs the operation in step 2 only when the CHO recovery is enabled. The CHO recovery being enabled is described in embodiment 1, which will not be described herein again.

The statement that the UE has the stored CHO configuration can also be described as the UE being configured with a CHO. The source cell is a source PCell.

In this embodiment, the physical layer dedicated configuration, MAC layer configuration or SPS configuration in the CHO configuration (a configuration included in the RRC reconfiguration message) stored by the UE and configured by the target candidate cell are always based on the corresponding system default configuration. That is, the above configuration in the CHO configuration configured by the target candidate cell is always a delta configuration based on the corresponding system default configuration.

Embodiment 5

This embodiment is performed on an RRC layer of UE. As described in the background section, monitoring timers currently used to trigger an RLF include T310 and T312. The two timers have different triggering conditions and can be in a running state at the same time. When one of the timers expires, the RLF is triggered, while the other timer is still running. In a CHO recovery procedure, if the other running timer expires in this case, it may cause the UE to enter an RLF state again, thereby re-performing a CHO recovery procedure, which prolongs the link interruption time and affects the service continuity. In this embodiment, if the UE enters a CHO recovery procedure, the UE stops the running RLF-related timer to prevent the above situation from occurring and shorten the link interruption time.

Step 1: An RLF occurs in UE, as when a T310 or T312 expires, the UE claims the RLF.

Step 2: The UE initiates a CHO recovery procedure. In an initialization phase of initiating the CHO recovery procedure, the UE performs the following operations: if there is a running T310, stopping the T310; if there is a running T312 associated with an MCG, stopping the T312.

Preferably, the initialization phase of initiating the CHO recovery procedure refers to a phase before initiating a cell selection procedure. Or, after the RLF/HOF occurs, the UE performs the operation of stopping the timer. Preferably, the UE performs step 2 only when the UE has the stored CHO configuration and the CHO recovery is enabled. The CHO recovery being enabled is described in embodiment 1, which will not be described herein again.

Step 3: The UE performs the CHO recovery procedure. The CHO recovery procedure is as described above, which will not be described herein again.

Embodiment 6

Provided in the embodiment is a method for recovering a link when the RLF of the MCG occurs in a case that the UE is configured with dual connectivity while an MCG failure information function is enabled and the CHO is configured. Considering a scenario, when the RLF or HOF occurs, the UE first attempts to perform an MCG failure information procedure to recover a link, and before receiving a response message from the network side, the UE monitors that a CHO execution condition is met. In this embodiment, a solution for the UE behavior in the scenario is provided, so that the UE can determine whether to continue performing the MCG failure information procedure to wait for the response message from the network side, or to perform a CHO handover to a target candidate cell where the execution condition is met.

Step 1: The UE initiates an MCG failure information procedure.

Step 2: The UE stops the ongoing CHO execution condition evaluation/monitoring. Preferably, step 2 is performed in an initialization phase of the MCG failure information procedure. Alternatively, the UE may perform step 2 before initiating the MCG failure information procedure after the RLF/HOF fails.

The UE performs step 2 when the UE has the stored CHO configuration.

Embodiment 7

Provided in the embodiment is a method for recovering a link when the RLF of the MCG occurs in a case that the UE is configured with dual connectivity while an MCG failure information function is enabled and the CHO is configured. This embodiment has the same scenario as embodiment 6. In this embodiment, the UE ends the ongoing MCG failure information procedure to perform the triggered CHO.

Step 1: The UE initiates an MCG failure information procedure. In the procedure, the UE starts a T316 and suspends MCG transmission.

Step 2: The UE triggers a CHO. When monitoring/evaluating that the CHO execution condition of a CHO candidate cell is met, the UE triggers a CHO of the cell.

Step 3: The UE stops the T316. When initiating the CHO, the UE performs an initialization phase of the CHO and stops the T316. The step further includes that the UE resumes the MCG transmission.

The T316 is used to monitor the MCG failure information procedure as described in the background section. Preferably, the MCG transmission is the MCG transmission corresponding to all SRBs and DRBs.

Embodiment 8

In this embodiment, when performing a CHO, UE always ends an MCG failure information procedure first before performing the CHO. This embodiment has the same scenario as embodiment 7, except that the description is different.

Step 1: The UE triggers a CHO. When monitoring/evaluating that the CHO execution condition of a CHO candidate cell is met, the UE triggers a CHO of the cell.

Step 2: If there is a running T316, the UE stops the T316. Preferably, when initiating the CHO, the UE performs an initialization phase of the CHO and stops the T316. The step further includes that the UE resumes the MCG transmission.

The T316 is used to monitor the MCG failure information procedure as described in the background section. Preferably, the MCG transmission is the MCG transmission corresponding to all SRBs and DRBs. The initiating of the CHO refers to the UE applying the stored CHO configuration.

Embodiment 9

This embodiment has the same scenario as embodiment 7, and the difference lies in that when a CHO is triggered in an MCG failure information procedure, the UE ignores the triggered CHO, that is, the UE does not perform the triggered CHO.

Step 1: The UE initiates an MCG failure information procedure.

Step 2: The UE triggers a CHO. When monitoring/evaluating that the CHO execution condition of a CHO candidate cell is met, the UE triggers a CHO of the cell.

Step 3: Ignore the triggered CHO, and do not perform the triggered CHO.

This embodiment may also be expressed as when a CHO is triggered, if a T316 is not running (that is, there is no ongoing MCG failure information procedure), the UE performs the triggered CHO. Or, when a CHO is triggered, if the T316 is running (that is, there is a running MCG failure information procedure), the UE does not perform the triggered CHO.

"The T316 is running" may also be expressed as "MCG transmission is suspended."

The above embodiments 6 to 9 are also applicable to a CHO scenario of a PSCell, that is, the UE has the stored CHO configuration for the PSCell. In this case, the CHO initiation/trigger refers to the CHO initiation/trigger corresponding to the PSCell.

In this embodiment of the present disclosure, the CHO-related operations performed by the UE, such as initiating a CHO or performing a CHO recovery procedure by the UE, even if not explicitly described, should be understood as including: the UE receiving the RRC reconfiguration message including a CHO configuration and a CHO execution condition from the source cell, storing the CHO configuration, and starting monitoring whether the CHO execution condition is met according to the CHO execution condition included in the RRC message.

Embodiment 10

Figure 5:
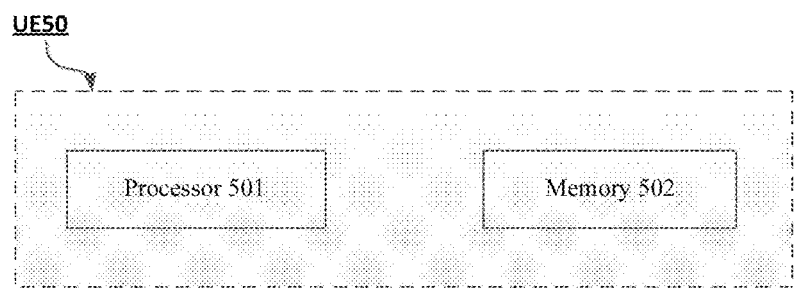
FIG. 5 is a block diagram showing user equipment (UE) related to the present disclosure.

In this embodiment, the user equipment according to the present disclosure is described. FIG. 5 is a block diagram showing the user equipment (UE) involved in the present invention. As shown in FIG. 5, the user equipment (UE) 50 includes a processor 501 and a memory 502. The processor 501 may include, for example, a microprocessor, a microcontroller, an embedded processor, and the like. The memory 502 may include, for example, a volatile memory (such as a random access memory (RAM)), a hard disk drive (HDD), a non-volatile memory (such as a flash memory), or other memories. The memory 502 stores program instructions. When run by the processor 501, the instructions can perform the method for radio link recovery described in detail in the present invention.

In the present disclosure, some different embodiments can cooperate with each other.

In the present disclosure, the term "base station" refers to a mobile communication data and control switching center with a larger transmit power and a wider coverage area, and has functions of resource distribution scheduling, data receiving and transmitting, and the like. The term "user equipment" refers to a user mobile terminal, for example, a terminal device capable of performing wireless communication with a base station or a micro base station, including a mobile phone, a notebook computer, and the like.

The methods and related devices according to the present disclosure have been described above in conjunction with preferred embodiments. It should be understood by those skilled in the art that the methods shown above are only exemplary. The method according to the present disclosure is not limited to steps or sequences shown above. The base station and user equipment shown above may include more modules. For example, the base station and user equipment may further include modules that may be developed or will be developed in the future to be applied to a base station, an MME, or UE. Various identifiers shown above are only exemplary, not for limitation, and the present disclosure is not limited to specific information elements serving as examples of these identifiers. Those skilled in the art can make various alterations and modifications according to the teachings of the illustrated embodiments.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A user equipment (UE), comprising:
receiving circuitry configured to receive a radio resource control (RRC) message which carries one or more execution conditions corresponding to a candidate cell;
a processor configured to perform execution condition evaluation for a conditional reconfiguration according to the one or more execution conditions; and
transmitting circuitry, wherein
the processor is configured to, upon detecting a radio link failure of a master cell group (MCG) when an MCG transmission is not suspended, initiate an MCG failure information procedure to inform a network of the radio link failure of the MCG the UE has experienced,
the processor is configured to stop the execution condition evaluation in the MCG failure information procedure, and
the transmitting circuitry is configured to transmit an MCG failure information message in the MCG failure information procedure.

2. A method performed on a user equipment (UE), comprising:
receiving a radio resource control (RRC) message which carries one or more execution conditions corresponding to a candidate cell;
performing execution condition evaluation for a conditional reconfiguration according to the one or more execution conditions;
upon detecting a radio link failure of a master cell group (MCG) when an MCG transmission is not suspended, initiating an MCG failure information procedure to inform a network of the radio link failure of the MCG the UE has experienced;
stopping the execution condition evaluation in the MCG failure information procedure; and
transmitting an MCG failure information message in the MCG failure information procedure.

3. The UE according to claim 1, wherein
the conditional reconfiguration is a conditional handover or a conditional primary secondary cell (PSCell) change, and
the execution condition evaluation is stopped in the MCG failure information procedure regardless of whether the conditional reconfiguration is the conditional handover or the conditional PSCell change.

4. The UE according to claim 1, wherein
the execution condition evaluation is a measurement event evaluation.

* * * * *